2,740,745

PROCESS FOR PREPARING ARYLACETYL-CARBINOLS

David Hendlin, Elizabeth, N. J., and Paul F. Smith, Ridley Park, Pa., assignors to Merck & Co., Inc., Rahway, N. J., a corporation of New Jersey No Drawing. Application April 30, 1954, Serial No. 426,922

11 Claims. (Cl. 195—37)

This invention relates to the prepartion of acetylcarbinols and particularly to the conversion of arylaldehydes to arylacetylcarbinols for fermenting yeast.

The commercial production of arylacetylcarbinols from arylaldehydes by the fermentation of yeast has been heretofore hindered by the formation of arylmethanol. The formation of the alcohol has a two-fold disadvantage in that it results in the loss of the arylaldehydes precursor and also reduces the yield of the desired arylacetylcarbinols. The loss of the arylaldehyde is a critical factor in the economics of the process since it is presently the most expensive ingredient.

An object of the invention is to provide an improved process for the production of arylacetylcarbinols. A related object is to improve such a process from the standpoint of economy and increased yield.

In accordance with the invention arylacetylcarbinols are produced from arylaldehydes by the fermentation of yeast in the presence of nicotinic acid antagonists. The nicotinic acid antagonists cause selective inhibition of alcohol formation with a resultant increase in arylacetylcarbinol production.

The nicotinic acid antagonists are inhibitory analogs of nicotinic acid and are defined as compounds capable of inhibiting enzymatic reactions in which nicotinic acid is a co-factor. Typical examples of such compounds are 3-acetyl pyridine; 3-pyridine sulfonic acid; 3-pyridine sulfonamide; α-picolinic acid; α-picoline; 6-aminonnicotinic amide; 5-chloronicotinic acid amide; 5-fluoronicotinamide; nicotinamide; isonicotinamide, 1,3-diphenyl, 1,3-propandione; and pyrazinamide. The antagonists vary in their effectiveness but a molar concentration in the fermentation medium of from about 0.0001 to about 0.1 is generally suitable. The preferred range is a molar concentration of 0.05 to 0.0005.

The arylacetylcarbinol produced depends on the precursor aldehyde selected. Typical examples of the arylaldehydes are benzaldehyde, m-acetylhydroxybenzaldehyde, m-hydroxybenzaldehyde, p-hydroxybenzaldehyde, m-benzyloxy-benzaldehyde, isovanillin, α naphthaldehyde, p-tolualdehyde, protocatechuic aldehyde, veratraldehyde, isopropylbenzaldehyde, p-methoxybenzaldehyde, durylaldehyde, and ethoxy-methoxy-benzaldehyde.

The fermentation of the yeast is carried out in the conventional manner in the presence of the nicotinic acid antagonist. As an example, the process may be carried out by dissolving a carbohydrate or pyruvic acid in water and adding the yeast and then the antagonist; after some time, during which the fermentation process is initiated, the aldehyde, preferably dissolved in water, is added, while stirring, to the fermentation solution. During the fermentation process, the aldehyde is transformed into the corresponding arylacetylcarbinol, probably by the action of the carboligase contained in the yeast. The solution is separated from the yeast by filtering, or by allowing the yeast to form a layer and siphoning off the solution from the layer. From the solution thus obtained, the arylacetylcarbinol is separated by known methods. The pH of the fermentation medium is preferably adjusted to about 5 to 6 by the addition of phosphoric acid.

The following examples are given for purposes of illustration.

Example 1

A medium was prepared comprising 86 gm. refiners' cane molasses per liter of solution and the pH adjusted to 5.5 with phosphoric acid. Fifty ml. portions of the medium were placed in five 250 ml. Erlenmeyer flasks and 2 gm. of fresh pressed brewers' yeast was added to each flask. An inhibitor was added to each flask as noted in the table. Following one hour preformentation time at 28° C., 0.2 ml. of benzaldehyde was added to give a concentration of 4 mg. per ml. of solution. The fermentation was allowed to proceed for 2½ hours on a rotary shaker at 200 R. P. M. The broths were then filtered through celite filter aid in a Buchner funnel to remove the yeast cells. The clear broths were analyzed for benzyl alcohol and phenylacetylcarbinol (ketol). The ketol was determined by treating an aliquot of broth with excess 0.5 N iodine. Excess 10 N sodium hydroxide is added and the precipitated iodoform washed with 1 N hydrochloric acid. The iodoform, dried over calcium chloride in tared centrifuge tubes, is weighed and the amount of ketol calculated. No other compound in the broth gives an iodoform reaction.

| Inhibitor | Molar Concentration | Benzyl Alcohol, mg./ml. | Ketol, mg./ml. |
|---|---|---|---|
| None | | 2.53 | 1.71 |
| Pyrizinamide | 0.005 | 1.97 | 2.69 |
| 3-Acetylpyridine | 0.0005 | 1.82 | 2.71 |
|  | 0.002 | 1.85 | 2.14 |
| Pyridine-3-sulfonic acid | 0.0005 | 2.33 | 2.66 |
|  | 0.002 | 2.00 | 2.61 |
| α-Picolinic acid-hydrochloride | 0.0005 | 1.95 | 2.44 |
|  | 0.002 | 2.00 | 2.36 |

Example 2

Acetone powders were prepared from fresh pressed brewers' yeast by the method of Hochster and Quastel reported in Arch. Biochem. Biophys., 31, 278–284. The following were present in the cell-free reaction mixture: acetone powder, 5 mg.; nicotinamide, 0.005 molar, adenosine triphosphate, 0.0005 molar, reduced diphosphopyridine nucleotide (prepared by the hyposulfite method of G. A. Le Page 1949 in Umbreit) 0.0005 molar; phosphate buffer pH 6.5, 0.07 molar and benzaldehyde, 72 micromoles. The inhibitors as noted on the table were added and the medium held at 28° C. for ten minutes. The aldehyde was then added and the reaction allowed to proceed for 30 minutes. The following table shows the result obtained with various inhibitors based on controls.

| Inhibitor | Molar Concentration | Percent Inhibition of Benzyl Alcohol |
|---|---|---|
| 3-Acetylpyridine | 0.002 | 39 |
| Pyridine 3-sulfonic acid | 0.0005 | 14 |
|  | 0.002 | 51 |
| α-Picolinic acid | 0.0005 | 12 |
|  | 0.002 | 13 |
| Pyrazinamide | 0.005 | 100 |
| Nicotinamide | 0.05 | 100 |
| Isonicotinamide | 0.05 | 64 |

Any departure from the above description which conforms to the present invention is intended to be included within the scope of the claims.

What is claimed is:

1. In the process wherein an arylaldhyde is fermented with yeast to form the corresponding arylacetylcarbinol, the improvement which comprises carrying out the fermentation in the presence of a nicotinic acid antagonist selected from the group consisting of 3-acetyl pyridine; 3-pyridine sulfonic acid; 3-pyridine sulfonamide; α-picolinic acid; α-picoline; 6-aminonicotinic amide; 5-chloronicotinic acid amide; 5-fluoronicotinamide; nicotinamide; isonicotinamide; 1,3-diphenyl-1,3-propandione; and pyrazinamide.

2. In the process wherein an arylaldehyde is fermented with yeast to form the corresponding arylacetylcarbinol, the improvement which comprises carrying out the fermentation in the presence of pyrizinamide.

3. In the process wherein an arylaldehyde is fermented with yeast to form the corresponding arylacetylcarbinol, the improvement which comprises carrying out the fermentation in the presence of 3-acetylpyridine.

4. In the process wherein an arylaldehyde is fermented with yeast to form the corresponding arylacetylcarbinol, the improvement which comprises carrying out the fermentation in the presence of nicotinamide.

5. In the process wherein an arylaldehyde is fermented with yeast to form the corresponding arylacetylcrabinol, the improvement which comprises carrying out the fermentation in the presence of isonicotinamide.

6. In the process wherein an arylaldehyde is fermented with yeast to form the corresponding arylacetylcarbinol, the improvement which comprises carrying out the fermentation in the presence of pyridine-3-sulfonic acid.

7. In the process wherein an arylaldehyde is fermented with yeast to form the corresponding arylacetylcarbinol, the improvement which comprises carrying out the fermentation in the presence of a molar concentration of about 0.0001 to about 0.1 of a nicotinic acid antagonist selected from the group consisting of 3-acetyl pyridine; 3-pyridine sulfonic acid; 3-pyridine sulfonamide; α-picolinic acid; α-picoline; 6-aminonicotinic amide; 5-chloronicotinic acid amide; 5-fluoronicotinamide; nicotinamide; isonicotinamide; 1,3-diphenyl-1,3-propandione; and pyrazinamide.

8. In the process wherein benzaldehyde is fermented with yeast to form phenylacetylcarbinol, the improvement which comprises carrying out the fermentaion in the presence of a nicotinic acid antagonist selected from the group consisting of 3-acetyl pyridine; 3-pyridine sulfonic acid; 3-pyridine sulfonamide; α-picolinic acid; α-picoline; 6-aminonicotinic amide; 5-chloronicotinic acid amide; 5-fluoronicotinamide; nictinamide; isonicotinamide; 1,3-diphenyl-1,3-propandione; and pyrazinamide.

9. In the process wherein an arylaldehyde in an aqueous solution of carbohydrates is subjected to a fermentation process by means of yeast to produce the corresponding arylacetylcarbinol, the improvement which comprises carrying out the fermentation in the presence of a nicotinic acid antagonist selected from the group consisting of 3-acetyl pyridine; 3-pyridine sulfonic acid; 3-pyridine sulfonamide; α-picolinic acid; α-picoline; 6-aminonicotinic amide; 5-chloronicotinic acid amide; 5-fluoronicotinamide; nicotinamide; isonicotinamide; 1,3-diphenyl-1,3-propandione; and pyrazinamide.

10. In the process wherein an arylaldehyde in an aqueous solution of pyruvic acid is subjected to a fermentation process by means of yeast to produce the corresponding arylacetylcarbinol, the improvement which comprises carrying out the fermentation in the presence of a nicotinic acid antagonist selected from the group consisting of 3-acetyl pyridine; 3-pyridine sulfonic acid; 3-pyridine sulfonamide; α-picolinic acid; α-picoline; 6-aminonicotinic amide; 5-chloronicotinic acid amide; 5-fluoronicotinamide; nicotinamide; isonicotinamide; 1,3-diphenyl-1,3-propandione; and pyrazinamide.

11. The process which comprises adjusting the pH of an aqueous solution of carbohydrates, yeast, benzaldehyde, and a nicotinic acid antagonist selected from the group consisting of 3-acetyl pyridine; 3-pyridine sulfonic acid; 3-pyridine sulfonamide; α-picolinic acid; α-picoline; 6-aminonicotinic amide; 5-chloronicotinic acid amide; 5-fluoronicotinamide; nicotinamide; isonicotinamide; 1,3-diphenyl-1,3-propandione; and pyrazinamide to about 5 to 6 by the addition of phosphoric acid, fermenting the solution, and separating phenylacetylcarbinol thus obtained from the solution.

References Cited in the file of this patent

Porter: Bacterial Chemistry and Physiology, Wiley, 1946, page 777.

Annual Review of Biochemistry, vol. 18, 1949, page 543.

Sumner et al.: The Enzymes, vol 2, part 1, Academic Press Inc., N. Y., 1951, pages 202 to 209.